United States Patent [19]
Yee et al.

[11] Patent Number: 6,044,323
[45] Date of Patent: Mar. 28, 2000

[54] SATELLITE BASED COMMERCIAL AND MILITARY INTERCITY AND INTERCONTINENTAL AIR TRAFFIC CONTROL

[75] Inventors: David Moon Yee, Scottsdale; Robert Henry Bickley, Paradise Valley; Philip John Zucarelli, Glendale; Theodore Woolley Keller; Jeff Scott Osman, both of Scottsdale; Randall Keith Derr, Phoenix, all of Ariz.

[73] Assignee: Motorola, Inc., Schaumburg, Ill.

[21] Appl. No.: 08/954,261

[22] Filed: Oct. 20, 1997

[51] Int. Cl.[7] ...................................................... G06F 19/00
[52] U.S. Cl. ........................... 701/120; 701/13; 701/215; 701/300; 342/352; 342/357.06
[58] Field of Search .................................. 701/13, 14, 15, 701/120, 200, 206, 213, 214, 215, 300, 301, 302; 342/352, 357.01, 357.06; 455/12.1, 13.1

[56] References Cited

U.S. PATENT DOCUMENTS

| | | | |
|---|---|---|---|
| 4,918,609 | 4/1990 | Yamawaki | 342/357.01 |
| 5,126,748 | 6/1992 | Ames et al. | 342/357.01 |
| 5,160,935 | 11/1992 | Inamiya | 342/357.01 |
| 5,619,211 | 4/1997 | Horkin et al. | 342/352 |

*Primary Examiner*—William A. Cuchlinski, Jr.
*Assistant Examiner*—Gertrude Arthur
*Attorney, Agent, or Firm*—Bradley J. Botsch

[57] ABSTRACT

A satellite-based air traffic control system utilizes global-coverage satellite communications network to provide voice and data communication between an air traffic control center and one or more aircraft worldwide. Each aircraft is provided with an airborne navigation location reporting system device which has the capability of determining positional information of the aircraft and to transmit and receive voice and data messages to and from the ATC center via the satellite communications network.

38 Claims, 2 Drawing Sheets

– 6,044,323 –

SATELLITE BASED COMMERCIAL AND MILITARY INTERCITY AND INTERCONTINENTAL AIR TRAFFIC CONTROL

BACKGROUND OF THE INVENTION

The present invention relates generally to the field of aircraft communications, and more particularly to a satellite based air traffic control system.

Air traffic control (ATC) systems rely on assembling and managing accurate information on aircraft location and course within specified zones and in communicating data, voice and other information to and from such aircraft. ATC systems must provide at least communications, navigation and surveillance functions. ATC systems control the airspace and airchannels between local airports, monitor the position and various flight control sensor information of aircraft within its region, provide voice and data communication between an air traffic controller and each aircraft within the airspace of its control for exchanging information such as route changes, weather and safety alerts, landing instructions, and information relating to crew or equipment emergency situations.

Present day ATC systems utilize an air traffic communication infrastructure that has been in place since the 1950s. In the U.S., this air traffic communication infrastructure includes more than 400 airport towers, 185 terminal radar approach control sites (Tracons), and 20 regional en route centers. Air traffic control, including navigation, surveillance and communication remains, for the most part, entirely ground based. Airport towers monitor the aircraft while it is on the ground. Flight plans and instructions for take-off and landing are communicated via AM radio. Tracon sites monitor the aircraft and give flight instructions during take-off, approach and landing. Tracon sites typically monitor the aircraft up to 40 miles out of an airport in lower altitudes. Regional en route centers take over control of the aircraft in high altitudes. Each regional en route center maintains control over aircraft flying within its region, which may cover areas between 20 and 200 miles wide. As an aircraft enters or leaves the region of control of a regional en route center, the regional en route center communicates with either the Tracon site or the regional en route center having control over the airspace from which the aircraft is entering or to which the aircraft is leaving to coordinate a hand-off of control of the aircraft. Tracon sites monitor aircraft within its airspace using airport surveillance radar (ASR), which typically has a range of approximately 55 nautical miles. Regional en route centers monitor aircraft within its airspace using air route surveillance radar, which typically has a range of approximately 200 nautical miles. A grid of very high-frequency omnidirectional range (VOR) transmitters across the United States provides navigational information for aircraft as they approach and pass over them.

Each country or group of countries typically has its own ATC system and navigational infrastructure. This increases the complexity and therefore the reliability of aircraft hand-offs between different ATC systems. Furthermore, each ATC system may provide coverage of the entire country or group of countries, but more typically covers only a large part of it. Thus, some areas of some countries, and some areas between countries such as ocean airspace and the airspace over the polar regions are uncovered. In uncovered areas, aircraft must be separated by much larger distances to maintain safe operation.

Present day ATC systems clearly suffer from many disadvantages. First, present day ATC systems cannot globally track all aircraft with uniform high precision without a substantial increase in the network of regional en route centers and ground radar installations. Setting up and maintaining these centers and radar installations is very costly. Furthermore, it is impractical in remote regions of the earth. Still further, ground radar installations may be more susceptible to sabotage in hostile areas.

Another disadvantage of the current ATC system is that quality of radar and radio communication signals transmitted via land line links is susceptible to atmospheric interference. Fog and rain result in backscatter which distorts the ground surveillance radar.

Yet another disadvantage of the current ATC system is that because ATC systems are fragmented worldwide, a given aircraft may not be under the control and surveillance of a single ATC system during the entire length of its flight.

Accordingly, a need exists for a single integrated system which provides global coverage of all of the communication, navigation and surveillance functions required by an ATC system.

BRIEF DESCRIPTION OF THE DRAWING

The invention will be better understood from a reading of the following detailed description taken in conjunction with the drawing in which like reference designators are used to designate like elements, and in which.

DETAILED DESCRIPTION

The present invention is directed to the problem of developing a satellite based Air Traffic Control system which provides reliable instantaneous global communication between aircraft and between aircraft and air traffic control systems. The present invention provides a solution to the problems of current day ATC systems at significant cost reduction by utilizing a currently available low-orbit global-coverage satellite communications network to reduce infrastructure investment and complexity. The creation of a satellite based ATC system allows nearly instant communication response time, which may be significant in critical situations such as equipment failure and breaches of security. Furthermore, the use of a global-coverage satellite communications network in the ATC of the present invention makes possible the elimination of problems and difficulties encountered today in communication hand-offs between regional ATC systems and communication privileges and routings through different countries and governments. Moreover, the satellite based ATC of present invention allows both voice and digital data to be transmitted and received virtually error-free without susceptibility to atmospheric interference. Finally, the satellite based global-coverage ATC of the present invention may be fully integrated into the current day land-based ATCs to provide a backup system in the case of a failure of the primary ATC system.

In accordance with the present invention, there is provided a low-orbit global-coverage satellite network through which voice and digital data information may be transmitted and received. Further in accordance with the present invention, aircraft are supplied with a satellite communications device that conforms to physical and electrical aircraft performance standards and which is interconnected to existing aircraft navigation and communications resources such as an aircraft navigation system, a line-of-sight communications system, and other aircraft controls and sensors.

The satellite communications subscriber unit on board the aircraft repeatedly monitors navigation system information and selected aircraft status indicators and periodically reports this information to a primary contact point. Alternate contact points may be provided to allow calls to be made in case there is no response at the primary point. An authorized air traffic control center or airline entity may initiate a call to the subscriber unit on board an aircraft and obtain location and status information of the aircraft en route anywhere around the earth. Each satellite communications device on each aircraft may be called by utilizing a specific identification number. A preprogrammed emergency message may be sent in response to aircrew action or other sensor input and may include aircraft status information polled at the instant sent. Means for including a message to any of the above communications may also be provided.

Figure 1:
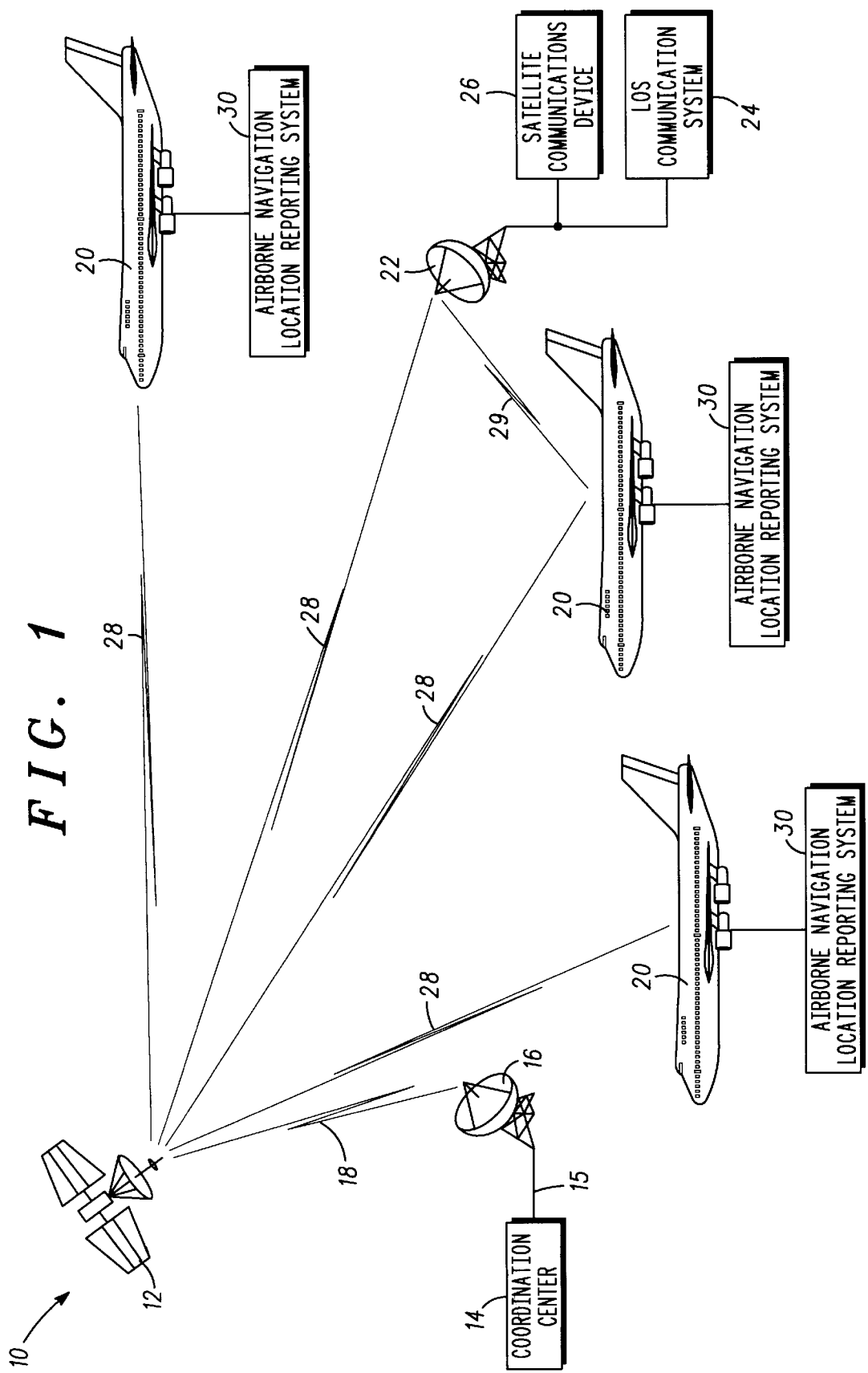
FIG. 1 illustrates a satellite based Air Traffic Control System in accordance with the present invention.

FIG. 1 illustrates an Air Traffic Control System (ATCS) in accordance with the present invention. As shown in FIG. 1, the ATCS, shown generally at 10, includes an Air Traffic Control (ATC) center 14 and one or more aircraft 20 in communication via a low-orbit global-coverage satellite communications network 12. The satellite communications network 12 is used to provide voice and data communications between airborne aircraft 20 and between airborne aircraft 20 and the ATC center 14.

Figure 2:
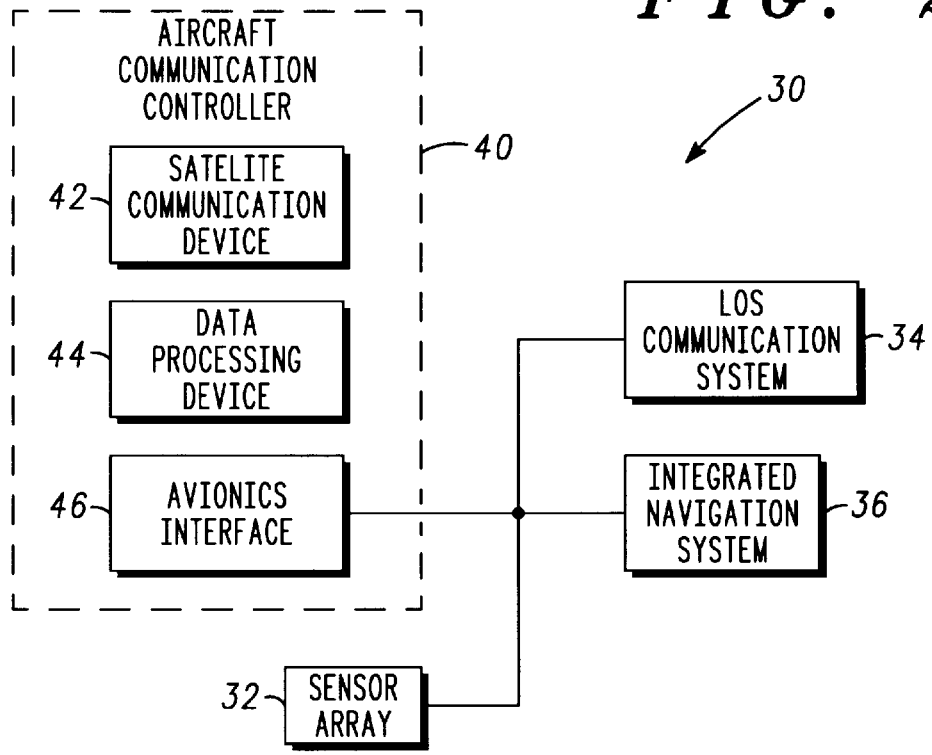
FIG. 2 is a block diagram of a preferred embodiment airborne navigation location reporting system which is provided in each of the ATC system aircraft in the present invention.

Each airborne aircraft 20 in the ATCS 10 is provided with an airborne navigation location reporting system 30. FIG. 2 is a block diagram of the airborne navigation location reporting system 30 provided in each aircraft 20 of FIG. 1. As shown in FIG. 2, the airborne navigation location reporting system 30 includes an aircraft communications controller 40, a sensor/control array 32 which monitors aircraft control and sensor information, an integrated navigation system (INS) 36, and preferably a conventional communications system 34 such as the currently used line-of-site (LOS) system. The sensor/control array 32 typically monitors the aircraft's position, altitude, heading, and control information. The inclusion of a conventional communications system 34 is not necessary to the invention, but may be provided where the ATCS 10 is to be integrated into a present day ATC system which uses line-of-site communication between local airport control towers, terminal radar approach controls (TRACONS), and en route centers and the airborne aircraft. It may also be desired to include a conventional communication system aboard the aircraft to provide ATC communication system redundancy in case a backup system is required.

As also shown in FIG. 2, the aircraft communications controller 40 preferably includes a satellite communications device 42, a data processing device 44, and an avionics interface device 46. The satellite communications device 42 establishes a satellite link with the satellite communications network 12, and transmits and receives voice and data to and from the satellite communications network 12. The avionics interface device 46 receives avionics control and sensor information and converts it to a format which may be processed by the data processing device 44. The data processing device 44 receives avionics control and sensor information via the avionics interface device 46 and voice and data input via the satellite communications device 42, and performs pre-programmed or remotely downlinked instructions. The data processing device 44 may initiate a call to the satellite communications network 12 to send a voice or data message, as for example, to report a sensor condition received from the sensor array 32, or in response to a pilot talk button. The data processing device 44 may additionally or alternatively perform a set of instructions in response to input from the avionics interface device 46 or from the satellite communication device 42 and or output control signals to the sensor/control array 32, the INS 36, or other aircraft resources.

During normal operation, the airborne aircraft 20 reports position and aircraft status information to the ATC control center 14 via its satellite communication device 42 over the low-orbit satellite communications network 12. A satellite link 28 between the airborne aircraft 20 and the ATC center 14 is maintained regardless of weather or terrain conditions because all communication is line of sight between an aircraft and an LEO satellite or between the ATC center and an LEO satellite with UHF or microwave frequencies. The aircraft position information is derived from the sensor/control array 32 and or the INS 36 contained within the airborne navigation location reporting system 30. Instructions, flight vectors, cruising altitudes, and other information, are sent out to the airborne aircraft 20 by the ATC center 14 through the same communications path (15, 18, 12, 28, 42).

When the airborne aircraft 20 is in range of a local airport control tower 22, a line of sight (LOS) link 29 may be established between them using the LOS communication system 34 aboard the airborne aircraft 20 and in the airport control tower 22. The ATC center 14 coordinates the handoff of the control of the airborne aircraft 20 to or from the local airport control tower 22 via a satellite link 28. Alternatively, the local airport control tower 22 may communicate with the local incoming/outgoing aircraft 20 entirely via satellite links 28.

The ATC center 14 maintains control over a designated airspace (i.e., it's region of control) by monitoring the navigation information of the various airborne aircraft 20 within its range of airspace which is sent through the satellite communications network 12. The ATC center 14 preferably communicates with aircraft within its airspace by sending voice and data instructions and commands over an uplink to the satellite communications network 12, which in turn sends these messages over communications channels via the satellite links 28 to aircraft within the ATC center's region.

The satellite communication device 42 of a particular aircraft receives the messages transmitted over the communications channels and listens for messages addressed to it. A person skilled in the art will appreciate that many methods of identifying uniquely addressed messages exist. In a preferred embodiment, this is accomplished by sending a unique identifier which matches the unique identifier of the satellite communication device 42 in a header portion of a data packet sent over the communications channel. Voice and data messages may be sent from an aircraft 20 to an ATC center 14 by sending the message to the satellite communications network 12 over a communications channel of a satellite communications link 28. The satellite communications network 12 routes the message to the satellite closest to the ATC center 14 and transmits the message to the gateway servicing the ATC center 14 via a satellite downlink. The message is transferred between the gateway 16 and the ATC center 14 via a standard ground communications link 15 such as by the public switched telephone network (PSTN), leased land lines, or other means. A two-way conversation may also be set up between an ATC center 14 and one or more aircraft over which voice and data messages may be exchanged via a satellite communications channel, discussed hereinafter with respect to the preferred embodiment.

In the preferred embodiment, the satellite communications network 12 is the IRIDIUM™ Communications System, developed and launched by the Satellite Communications Division (SATCOM) of Motorola, Inc. in Chandler, Ariz. The IRIDIUM™ system will ultimately provide an array of sixty-six (64 plus 2 backup) satellites in low earth orbit (420 nautical miles) around the earth. The IRIDIUM™ satellites are arranged so as to provide substantially world-wide cellular radio coverage. For example, a satellite communications device 42, such as an IRIDIUM™ subscriber unit comprising a satellite cellular radio having geolocation and emergency message capability, may contact any satellite which is visible Above-The-Horizon of the IRIDIUM™ subscriber unit through a satellite communications link. The Above-The-Horizon satellite operates under the control of one or more ground stations, or "gateways" located in key areas around the world. IRIDIUM™ gateways interconnect the IRIDIUM™ satellite network to public switched telephone networks (PSTNs). This network function makes communication possible between IRIDIUM™ subscriber units and any other telephone connected to a public switched telephone network. IRIDIUM™ gateways comprise a Siemens EWSD-based D900 switch. Based on the GSM (Global System for Mobile Communications) cellular standard, the D900 switch enables a seamless integration of IRIDIUM™ services with land-based ATC telecommunications systems. In the preferred embodiment, regional ATC centers are configured to be in communication with a local gateway through a ground communications link, such as a standard land line link or a microwave link. An Above-The-Horizon satellite receives and routes messages between the IRIDIUM™ subscriber units and regional ATC center gateways using a destination address contained within the message and routing information stored in the satellite and/or provided via the gateway from the regional ATC center. A great virtue of the IRIDIUM™ satellite communications network over other switched network satellite systems is the great flexibility it provides for communicating with the satellite communications devices since both origin and destination need not be within the footprint of any single satellite at the same time. Inter-satellite crosslinks allow IRIDIUM™ satellites to hand-off messages to other satellites in the same or adjacent orbiting planes to ultimately reach an OTH satellite whose footprint covers the message's addressee.

The IRIDIUM™ satellite communications network provides significant advantages over other currently available satellite systems. First, because IRIDIUM™ is a low-orbit network, the power required to transmit and receive signals via satellite is lower than traditional higher-orbit stationary satellite communications networks. Second, because the IRIDIUM™ satellite communications network will utilize a constellation of low earth orbit satellites which has been configured to any ATC center or authorized airline entity and any aircraft on or near the surface of the earth may communicate with any other ATC center, authorized airline entity or aircraft located on or near the surface of the earth. This provides a significant advantage over current ATC systems in that an aircraft may fly anywhere on earth and still remain within the single ATCS of the invention. Because the ATCS of the present invention does not require hand-offs of aircraft control between different ATCS's of different countries or regions for international flights, the entire flight of an aircraft may be monitored, which improves safety.

In the preferred embodiment, the satellite communication device 42 is implemented with an IRIDIUM™ subscriber unit. The IRIDIUM™ subscriber unit 42 communicates with the IRIDIUM™ satellite communications network 12 via satellite communication link 28. The satellite communication links 28 encompass a limited portion of the electromagnetic spectrum that is divided into numerous channels. As a minimum, an IRIDIUM™ satellite continuously transmits over one or more broadcast channels. An IRIDIUM™ subscriber unit 42 synchronizes to and monitors the broadcast channels to detect data messages which may be addressed to it. The IRIDIUM™ subscriber unit 42 may transmit messages to the IRIDIUM™ satellite communication network 12 over one or more random access channels via satellite communication link 28. Broadcast channels and random access channels are not dedicated to any particular IRIDIUM™ subscriber unit 42 but are shared by all IRIDIUM™ subscriber units currently within the footprint of the particular IRIDIUM™ satellite.

IRIDIUM™ satellites may also set up traffic channels. Traffic channels are bidirectional communication channels that may be assigned to particular IRIDIUM™ subscriber units 42 under the control of an ATC center 14. Traffic channels support real-time communication. For voice communications, at least one traffic channel is assigned for each call regardless of whether the ATC center 14 or an aircraft 20 initiated the call. Each traffic channel has sufficient bandwidth to support, as a minimum, a two-way voice conversation.

In the preferred embodiment of the present invention, a digital format is used to communicate data over the links (i.e., the broadcast channels, random access channels, and traffic channels). To support real-time communications, a combination of Frequency Division Multiple Access and Time Division Multiple Access (FDMA/TDMA) signal multiplexing is employed. Frequency is divided into channels, and time within the channels are divided into frames. Particular channels are assigned particular transmit and receive timeslots within each frame. Analog audio signals are digitized so that an entire frame's signal is transmitted or received in a single short high speed burst during an allotted timeslot.

Figure 3:
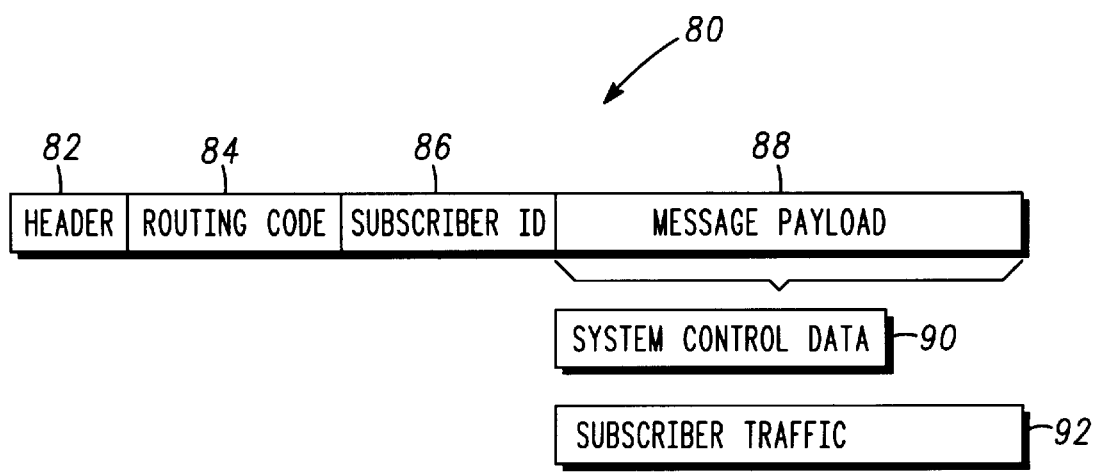
FIG. 3 is an example data packet format which may be used to carry data messages in one preferred embodiment of the invention.

FIG. 3 shows a block diagram of an exemplary data packet 80 that may be used to transport a message from the ATC center 14 to a satellite communications device 42 on an aircraft 20 (See FIGS. 1 and 2). Packet 80 includes a header 82, which carries data identifying a type characterization to be associated with packet 80, a length to be associated with packet 80, and any other information conventionally included in data packet headers. The type characterization may indicate whether the packet 80 exclusively conveys system control messages or whether it conveys subscriber traffic. A routing code 84 is included to instruct the satellite communications network 12 where to deliver the packet 80.

A subscriber ID 86 represents a code that uniquely identifies an IRIDIUM™ subscriber unit 42 and that is known to the identified IRIDIUM™ subscriber unit 42 and any satellite in the satellite communications network 12 providing a traffic channel to an IRIDIUM™ subscriber unit 42. An IRIDIUM™ subscriber unit 42 monitors subscriber IDs 86 of packets 80 transmitted over a broadcast channel to determine if the packets 80 are intended for it. A satellite in the satellite communications network 12 uses subscriber IDs 86 of packets 80 that carry subscriber traffic to route such packet 80 to the traffic channels assigned to the identified subscriber units 42.

Header 82, routing code 84, and subscriber ID 86 represent overhead data which serve to get packet 80 to its destination. At the packet's destination, message data 88 is decoded and or acted upon. Message data 88 includes either system control data or system control data together with subscriber traffic. System control data are commands or messages which are interpreted and acted upon by the IRIDIUM™ subscriber units 42. These commands are typically very short. When system control data are delivered over a broadcast channel, subscriber traffic is omitted, and the resulting packet 80 is very short so that as many messages as possible may be broadcast over the broadcast channel. Subscriber traffic represents all subscriber data transported in the course of a call. When a packet 80 is delivered over a traffic channel, a significant amount of subscriber traffic is appended. As discussed above, a digitized version of an entire frame of conversational audio is conveyed by subscriber traffic 92. As will be appreciated by those skilled in the art the preceding description illustrates one of many implementations of delivering message data.

In the preferred embodiment, the sensor/control array 32 of the airborne navigation location reporting system 30 which monitors the aircraft's position, altitude, heading, and other sensor and control information, may comprise a Global Positioning System (GPS) receiver device, as for example a GPS receiver device in accordance with the principles of U.S. Pat. No. 4,785,463 entitled "Digital Global Positioning System Receiver" to Janc, et al. and assigned to the assignee-in-interest herein. A Global Positioning System (GPS) device utilizes the Global Positioning System (GPS) satellite constellation to determine the position of the aircraft 20. As known in the art, the GPS is a satellite-based radio-navigation system which provides highly accurate three-dimensional position information to GPS receivers at or near the surface of the Earth. GPS navigation techniques are known in the art, and discussed extensively in the literature. For a more thorough discussion of GPS, see U.S. Pat. No. 4,785,463, infra.

The INS 36 may derive the aircraft position via ground VOR transmitters or other navigational beacons that the aircraft passes over during flight, with a GPS or similar satellite navigation system receiver device, or using other implementations of inertial navigation systems. It is contemplated in the present invention to provide two alternative means for determining the aircraft's position in order to provide system redundancy in case of failure of the primary positional and navigational means.

The operation of the preferred embodiment is as follows. Each airborne aircraft periodically initiates a call to the IRIDIUM™ satellite communications network 12 to report location and status information. The IRIDIUM™ satellite communications network 12 broadcasts this information over pre-determined broadcast channels which may be monitored by ATC centers 14 and other aircraft 20. The ATC centers 14 send flight instructions and commands to the satellite communications network 12. Each instruction or command message is routed to a satellite which has the aircraft of interest within its footprint. This satellite broadcasts over broadcast channels, which are monitored by the aircraft within its footprint. The contents of the instruction or command messages may include flight instructions for the pilot, weather alerts or other airspace or ground status information.

In the preferred embodiment, the messages may contain more sophisticated control commands that may be processed by the data processing device 44 and sent through the avionics interface device 46 to the sensor/control array 32 to control aircraft controls or equipment. As will be appreciated by those skilled in the art, the usefulness of messaging is expansive and may be employed in any number of different applications. Accordingly, the situations and applications of use of the messaging capability described herein are not intended to be limiting.

Aircraft 20 and ATC centers 14 may communicate with one another via a bi-directional traffic channel. The aircraft 20 may be initially assigned to a traffic channel on the ground, and further assigned to different traffic channels when it is handed-off to other ATC centers 14 en route as the aircraft 20 travels into regions covered by other ATC centers 14. In the preferred embodiment, a call set up is initiated by either the ATC center 14 (or local TRACON) or the aircraft 20 by utilizing a specific identification number of the other. The call to the other's number sets up a satellite link between the ATC center 14 and the aircraft 20 and assigns both entities to a traffic channel. Once an aircraft 20 has been assigned to a traffic channel, two-way voice correspondence may be transmitted between the ATC center 14 and the aircraft 20. Communication via this traffic channel may occur during the entire duration of the flight or as long as the call remains connected.

In the alternative of, or coexisting with, traffic channel bidirectional voice and or data communication, voice or data messages which require confidentiality or where the user simply desires a private line may be communicated between an ATC center 14 and a particular aircraft 20, or between two aircraft 20, or between an aircraft 20 and any other entity accessible via a specific identification number, when one entity dials the phone number of the another entity. If a message is to be sent, it may be sent via a random access channel over a satellite link 28. If a bidirectional conversation is desired, the call is assigned to a traffic channel as described above, whereby only the desired parties are assigned to that particular traffic channel.

The satellite based ATC of the present invention may be interconnected to and integrated into present day ATC systems by providing a simple digital telephone line at the ATC centers 14 which are interconnected to a gateway or PSTN. Digital input telephone connections are known in the art and are readily available at ATC centers worldwide. ATC centers may also be provided with ground based versions of the airborne navigation location reporting system 30 that is provided in the aircraft 20 and which is altered to provide a ground based control interface to be connected to ground based controls rather than the avionics interface device 36 of the aircraft version. This ground based navigation location reporting system may also operate from any point desired (in this case, at the ATC center 14) and may be provided to operate on battery power for disaster or emergency conditions.

It will be appreciated by those skilled in the art that the present invention provides significant advantages over prior art ATC systems. Using a global-coverage satellite communications network and satellite communications devices, the present invention provides continuous availability of information on every airborne aircraft around the planet. Furthermore, it allows ATC centers, airline entities, other aircraft, or other authorized users to initiate and maintain bi-directional voice and data communications in a globally seamless manner with an aircraft independent of the caller's or the aircraft's location over the entire earth's surface.

Conversely, any aircraft may initiate and maintain bi-directional voice and data communications in a globally seamless manner with any entity having satellite communication capability or a PSTN phone number independent of the aircraft's location or the callee's location over the entire earth's surface.

It will also be appreciated from the above discussion that the present invention provides nearly instantaneously available voice and data communication immune to atmospheric interference. Additionally, the present invention may operate either within or fully redundant to present day ATC systems. Furthermore, since a global-coverage satellite communications network is already in place, implementation of the present invention may be achieved at dramatically reduced costs and installation and maintenance complexities. The use of a low-orbit global-coverage satellite constellation as the communications path allows the present invention the resultant opportunity to significantly reduce overall system complexity and improve reliability by eliminating the vast infrastructure of ground VOR transmitters and number of required ATC centers.

Although the invention has been described in terms of the illustrative embodiment, it will be appreciated by those skilled in the art that various changes and modifications may be made to the illustrative embodiment without departing from the spirit or scope of the invention. It is intended that the scope of the invention not be limited in any way to the illustrative embodiment shown and described but that the invention be limited only by the claims appended hereto.

What is claimed is:

1. An air traffic control (ATC) system, comprising:
   a global-coverage satellite communications network;
   a control center in communication with said satellite communications network; and
   an aircraft comprising an airborne navigation location reporting system device which provides capability for transmitting and receiving voice and data messages to and from said control center via said satellite communications network independent of a positional location of said aircraft and a location of said control center, wherein said airborne navigation location reporting system device includes a sensor/control array which monitors aircraft control and sensor information, an aircraft navigation system for providing navigational information, and a satellite communications controller for detecting and receiving incoming messages from said satellite communications network and for transmitting outgoing messages, in response to said aircraft control and sensor information, said navigational information or said incoming messages, to said satellite communications network.

2. The air traffic control system of claim 1, wherein:
   said airborne navigation location reporting system device determines said positional location of said aircraft.

3. The air traffic control system of claim 2, wherein:
   said airborne navigation location reporting system device periodically or upon demand transmits said positional location of said aircraft to said satellite communications network.

4. The air traffic control system of claim 3, wherein:
   said control center establishes communication with said satellite communications network to receive said positional location of said aircraft.

5. The air traffic control system of claim 2, wherein:
   said airborne navigation location reporting system device comprises a satellite navigation system receiver which communicates with a satellite constellation for determining said positional location of said aircraft.

6. The air traffic control system of claim 1, wherein:
   said airborne navigation location reporting system device further comprises a ground based communications system.

7. The air traffic control system of claim 6, wherein:
   said ground based communications system provides a non-satellite-based means for communication between said aircraft and said ATC center.

8. The air traffic control system of claim 1, further comprising a local airport control tower in communication with said satellite communications network.

9. The air traffic control system of claim 8, wherein:
   control of said aircraft is handed-off between said ATC center and said local airport control tower via a satellite communications link through said satellite communications network.

10. The air traffic control system of claim 8, wherein:
    said local airport control tower communicates with said aircraft via a communications link routed through said satellite communications network.

11. The air traffic control system of claim 1, wherein:
    said satellite communications controller comprises:
    a satellite communications device for controlling transmit and receive functions between said airborne navigation location reporting system device and said satellite communications network;
    an avionics interface device coupled to said sensor/control array and said aircraft navigation system for monitoring aircraft system and navigational events; and
    a data processing device which receives and processes input data, said input data comprising said voice and data messages received from said satellite communications network via said satellite communications device, and said sensor/control information from said sensor/control array and said aircraft navigation system via said avionics interface device.

12. The air traffic control system of claim 11, wherein:
    said input data causes said data processing device to perform a set of pre-programmed instructions on said input data.

13. The air traffic control system of claim 12, wherein:
    said data processing device creates and passes a message containing a result of said pre-programmed instructions to said satellite communications device for transmission to said satellite communications network.

14. The air traffic control system of claim 11, wherein:
    said input data causes said data processing device to create and pass a message to said satellite communications device for transmission to said satellite communications network.

15. The air traffic control system of claim 14, wherein:
    said input data comprises a particular sensor condition detected on said sensor/control array via said avionics interface device.

16. The air traffic control system of claim 14, wherein:
    said input data comprises GPS receiver information which is passed in said message.

17. The air traffic control system of claim 11, wherein:
    said avionics interface device is also coupled to control inputs of said sensor/control array.

18. The air traffic control system of claim 17, wherein:
    said input data causes said data processing device to generate control signals to be sent to said control inputs of said sensor/control array via said avionics interface device.

19. The air traffic control system of claim 18, wherein:

said input data comprises a remote command sent from said ATC center via said satellite communications network.

20. The air traffic control system of claim 18, wherein:

said input data comprises a particular sensor condition detected on said sensor/control array via said avionics interface device.

21. The air traffic control system of claim 1, wherein:

said voice and data messages are sent between said ATC center and said aircraft vi inter-satellite links among different satellites in said satellite communications network.

22. An airborne navigation location reporting system device for an aircraft under control of a satellite based air traffic control system comprising a satellite communications network and control center, said aircraft and said control center in communication via said satellite communications network, comprising:

a sensor/control array which monitors aircraft control and sensor information;

an aircraft navigation system for providing navigational information; and a satellite communications controller for detecting and receiving incoming voice and data messages from said control center via said satellite communications network and for transmitting outgoing voice and data messages, in response to said aircraft control and sensor information, said navigational information or said incoming voice and data messages, to said control center via said satellite communications network.

23. The airborne navigation location reporting system device of claim 22, wherein:

said satellite communications controller comprises:

a satellite communications device for controlling transmit and receive functions between said airborne navigation location reporting system device and said satellite communications network;

an avionics interface device coupled to said sensor/control array and said aircraft navigation system for monitoring aircraft system and navigational events; and a data processing device which receives and processes input data, said input data comprising said incoming voice and data messages received from said satellite communications network via said satellite communications device and said sensor/control information from said sensor/control array and said aircraft navigation system via said avionics interface device.

24. The airborne navigation location reporting system device of claim 23, wherein:

said input data causes said data processing device to create and pass a message to said satellite communications device for transmission to said satellite communications network.

25. The airborne navigation location reporting system device of claim 24, wherein:

said input data comprises a particular sensor condition detected on said sensor/control array via said avionics interface device.

26. The airborne navigation location reporting system device of claim 24, wherein:

said input data comprises GPS receiver information which is passed in said message.

27. The airborne navigation location reporting system device of claim 23, wherein:

said input data causes said data processing device to perform a set of pre-programmed instructions on said input data.

28. The airborne navigation location reporting system device of claim 27, wherein:

said data processing device creates and passes a message containing a result of said pre-programmed instructions to said satellite communications device for transmission to said satellite communications network.

29. The airborne navigation location reporting system device of claim 24, wherein:

said avionics interface device is also coupled to control inputs of said sensor/control array.

30. The airborne navigation location reporting system device of claim 29, wherein:

said input data causes said data processing device to generate control signals to be sent to said control inputs of said sensor/control array via said avionics interface device.

31. The airborne navigation location reporting system device of claim 30, wherein:

said input data comprises a remote command sent from said ATC center via said satellite communications network.

32. The airborne navigation location reporting system device of claim 30, wherein:

said input data comprises a particular sensor condition detected on said sensor/control array via said avionics interface device.

33. A method for providing seamless global air traffic control in an air traffic control system comprising at least one air traffic control (ATC) center, an aircraft supplied with an airborne navigation location reporting system device, and a global-coverage satellite communications network, said method comprising the steps of:

generating air traffic control (ATC) messages at said ATC center, said ATC messages containing a unique identification code corresponding to said airborne navigation location reporting system device;

transmitting said ATC messages to said satellite communications network;

routing said ATC messages through said satellite communications network to said airborne navigation location reporting system device;

receiving said ATC messages at said airborne navigation location reporting system device; and generating aircraft messages at said airborne navigation location reporting system device;

transmitting said aircraft messages to said satellite communications network;

routing said aircraft messages through said satellite communications network to said ATC center;

receiving said aircraft messages at said ATC center.

34. The method of claim 33, wherein:

said ATC messages and said aircraft messages comprise voice messages.

35. The method of claim 33, further comprising the steps of:

configuring said airborne navigation location reporting system device to repeatedly monitor navigation system and aircraft sensor information and periodically transmit said information in an aircraft message to a contact point via said satellite communications network;

allowing an authorized user to contact said contact point to obtain said information.

36. The method of claim 35, wherein:

said authorized user comprises said ATC center.

37. The method of claim 33, wherein:

said ATC messages and said aircraft messages comprise data messages.

38. The method of claim 33, wherein:

said ATC messages comprise control commands.

* * * * *